No. 864,028. PATENTED AUG. 20, 1907.
F. M. PETERS.
SUGAR WAFER MACHINE.
APPLICATION FILED DEC. 4, 1905.
3 SHEETS—SHEET 1.
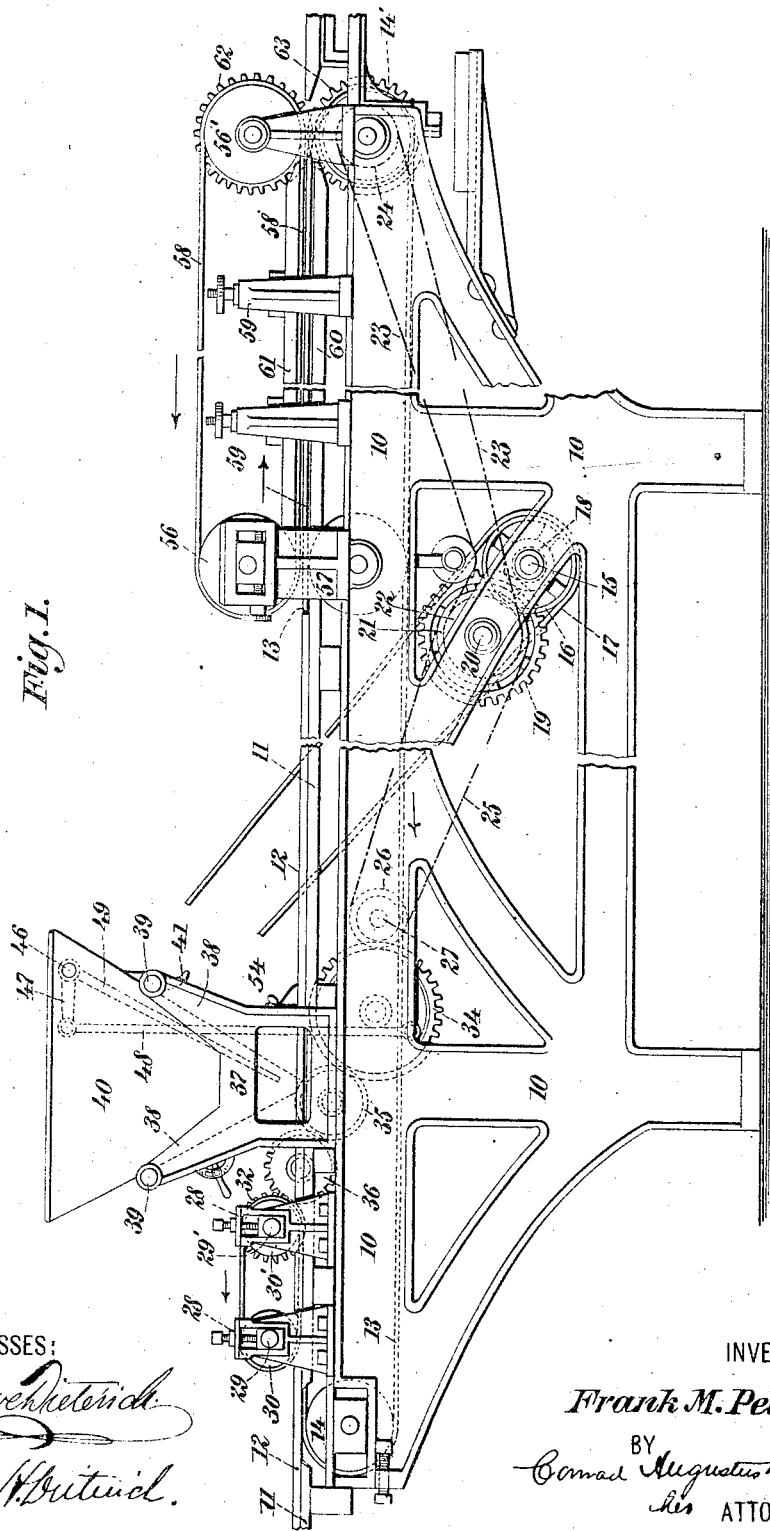
WITNESSES:
Gustave Dieterich
Edwin W. Dieterich
INVENTORS·
Frank M. Peters
BY
Conrad Augustus Dieterich
his ATTORNEY.

No. 864,028. PATENTED AUG. 20, 1907.
F. M. PETERS.
SUGAR WAFER MACHINE.
APPLICATION FILED DEC. 4, 1905.
3 SHEETS—SHEET 2.
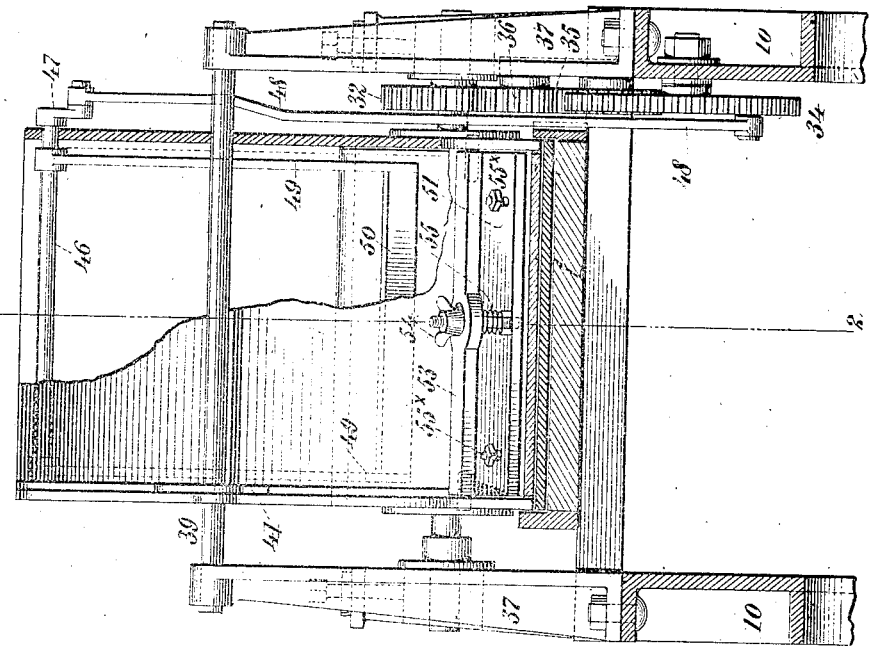
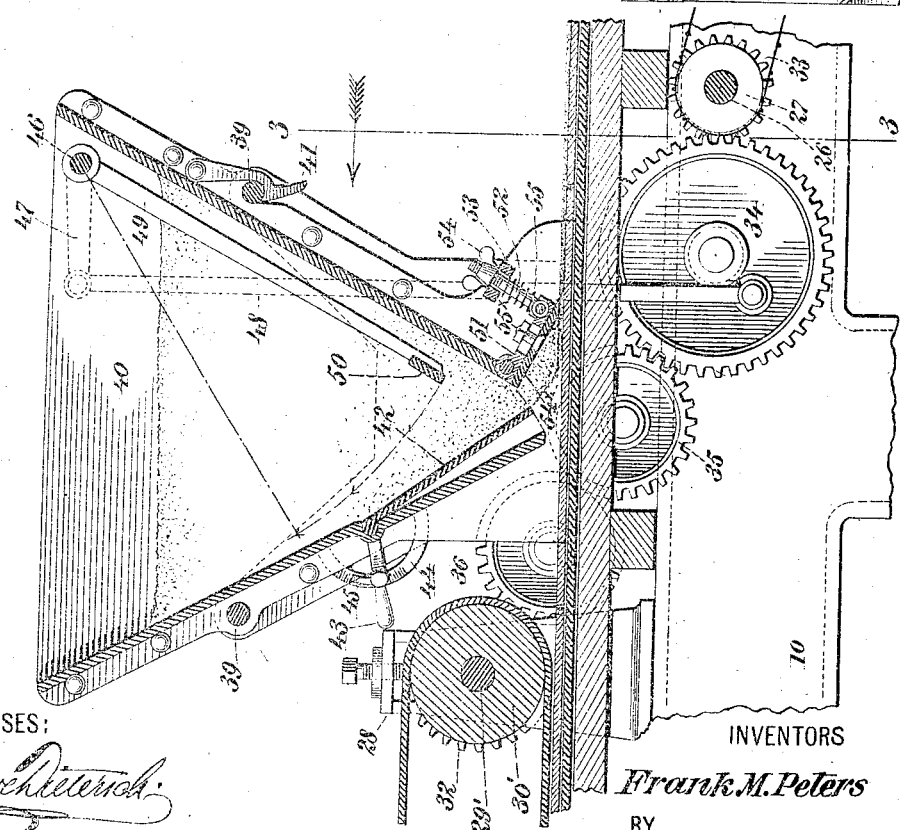
WITNESSES:
Gustav Dieterich
Edwin N. Dieterich
INVENTORS
Frank M. Peters
BY
Conrad Augustus Dieterich
his ATTORNEY No. 864,028. PATENTED AUG. 20, 1907.
F. M. PETERS.
SUGAR WAFER MACHINE.
APPLICATION FILED DEC. 4, 1905.

3 SHEETS—SHEET 3.

WITNESSES:
Gustave Dietrich
Edwin H. Dietrich

INVENTOR
Frank M. Peters
BY Conrad Augustus Wetend
his ATTORNEY

UNITED STATES PATENT OFFICE.

FRANK M. PETERS, OF CHICAGO, ILLINOIS.

SUGAR-WAFER MACHINE.

No. 864,028.    Specification of Letters Patent.    Patented Aug. 20, 1907.

Application filed December 4, 1905. Serial No. 290,066.

*To all whom it may concern:*

Be it known that I, FRANK M. PETERS, a citizen of the United States, residing at Chicago, Cook county, in the State of Illinois, have invented certain new and useful Improvements in Sugar-Wafer Machines, of which the following is a full, clear, and exact specification.

My invention relates to improvements in machines for producing sugar wafers and analogous products, and the same has for its object more particularly to provide a simple, efficient and reliable apparatus for applying the filling material or paste to the wafer sheets, and then duly spreading the same thereon.

These objects above set forth I am enabled to attain by means of my invention which consists in the novel details of construction, and in the combination, connection and arrangement of parts hereinafter more fully described and then pointed out in the claims.

Figure 5:
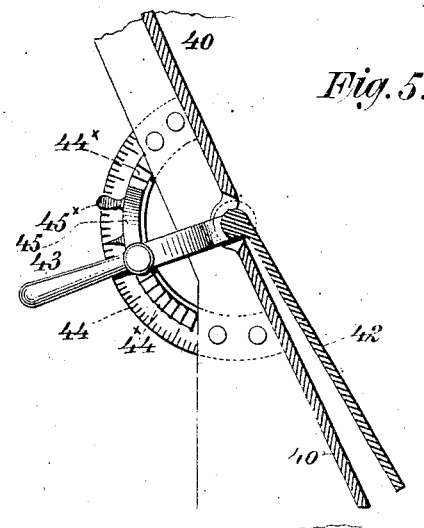
Figure 4:
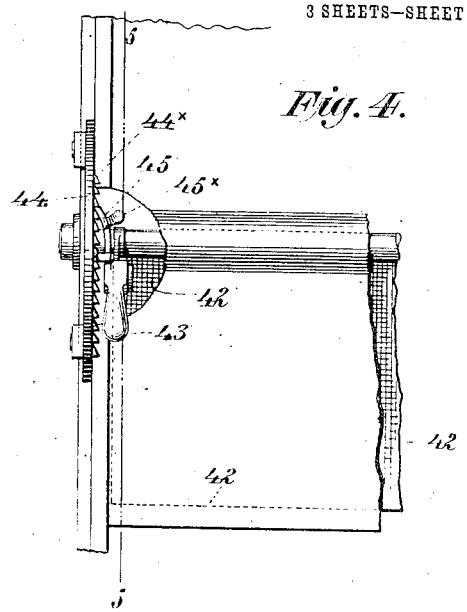
Figure 6:
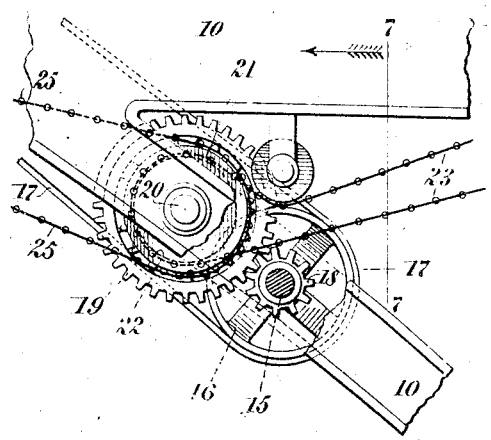
Figure 7:
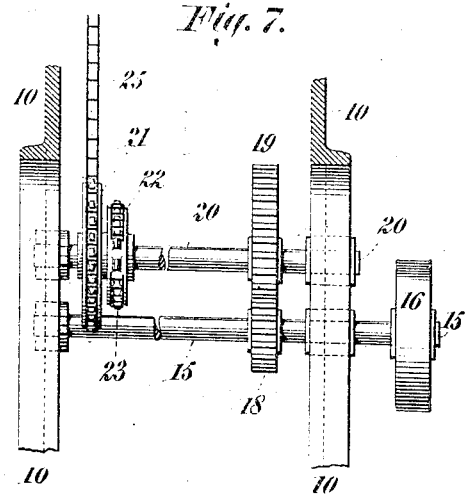

In the accompanying drawings forming part of this specification, wherein like numerals of reference indicate like parts, Figure 1 is a side view, partly broken out, showing a sugar wafer machine provided with a coating and spreading apparatus constructed according to and embodying my invention, Fig. 2 is an enlarged detail sectional view taken on the line 2—2 of Fig. 3, illustrating the paste hopper and related parts; Fig. 3 is a similar view taken on the line 3—3 of Fig. 2, showing said hopper and parts in end view; Fig. 4 is an enlarged partial end view of the paste receptacle partly broken away to show the plate for controlling the flow of paste, and the securing and indicating means therefor; Fig. 5 is a section of the same taken on the line 5—5 of said Fig. 4; Fig. 6 is an enlarged detail side view of a portion of the machine showing the gear and sprocket mechanism for operating the same, and Fig. 7 is a section of the same taken on the line 7—7 of said Fig. 6.

In said drawings 10 designates a frame having a top plate 11 arranged thereon above which and between the longitudinal guides 12 is arranged an endless band or conveyer 13 working upon transverse rollers 14, 14' arranged at opposite ends of the machine, the rollers 14 being adjustably mounted so as to permit of the adjustment of said band or conveyer 13.

Below the top plate 11 and near one end of the frame 10 is supported a main driving shaft 15 having a pulley 16 fixed thereon over which passes a driving belt 17. 18 denotes a gear wheel fixed on said main driving shaft 15 which meshes with a large gear wheel 19 on a shaft 20 supported above and to the left of the main driving shaft 15, and 21, 22 denote sprocket wheels fixed upon said shaft 20 near its forward end.

23 denotes a sprocket chain extending from the sprocket wheel 22 to the sprocket wheel 24 of the roller 14', and 25 a sprocket chain extending from the sprocket wheel 23 to a sprocket wheel 26 fixed on a shaft 27.

At the upper left hand end of the frame 10 are secured vertical brackets 28, 28, in which are adjustably mounted the ends of shafts 29, 29' carrying rollers 30, 30' over which passes an endless band 31.

32 denotes a gear wheel fixed at one end of the shaft 29' which gear wheel is actuated by the gear wheel 33 on the shaft 27 through the intermediate gears 34, 35, 36.

Adjacent to the roller 30' is arranged the mechanism for depositing and spreading the paste upon the wafer sheet, and the same consists of a frame comprising two side members 37 each having upwardly and outwardly extending arms 38, 38 connected by transverse rods 39 39.

40 denotes a paste hopper which is pivotally supported at one of its sides upon one of the transverse rods 39 and its opposite side adapted to rest upon the other of said rods and be secured thereto by a locking device 41. The hopper 40 is co-extensive in width with the endless belt or conveyer 13, and is entirely open at its bottom so that the paste or filling material therein may be deposited directly upon the wafer sheets as the same are carried under said hopper upon the belt or conveyer 13. Within said hopper near its bottom is arranged a flat gate or valve 42 which is pivotally secured at its upper edge to said hopper and its lower edge free and extending to the lower edge of said hopper, and 43 denotes an arm fixed to one end of a shaft or trunnion to which said gate or valve 42 is secured whereby the lower edge thereof may be adjusted or set to control the amount of paste discharged from the hopper.

44 denotes a segmental gage plate provided with a rack 44× which the detent 45 is adapted to engage to hold the gate or valve 42 to its adjusted position, and indicate the extent of its opening, and 45× a finger portion of said detent 45 by means of which said detent 45 may be released of its engagement with the rack 44×.

Within the hopper 40 and at one side thereof near its top is arranged a shaft 46 having one end extending through the side of said hopper and provided with a crank 47 to the outer end of which is pivotally secured the upper end of a rod 48 whose lower end is pivotally secured to the gear wheel 34. Upon the portion of the shaft 46 within the hopper are fixed the upper ends of arms 49 which are united at their lower ends by a blade 50.

Along the lower edge of the hopper opposite to the side to which the gate or valve 42 is secured is arranged a plate 51 which is pivotally secured along its upper edge to said hopper and at the middle of its outer edge is pivotally secured one end of a screw 52 whose upper end extends through an aperture in a transverse bar 53 which is pivotally supported at its ends in the projecting side portions of the hopper 40.

54 denotes an adjusting nut secured upon the screw 52 above the bar 53, and 55 a spring disposed upon said screw intermediate the adjusting plate 51 and the bar 53.

Upon the underside of the plate 51 is arranged a blade 54× which is adjustably secured thereto by bolts 55× extending through slots in said plate 51. The lower or outer edge of said blade 54× is scarfed and adapted to spread the paste under pressure upon the wafer sheets, while its inner edge is adapted to coöperate with the lower edge of the gate or valve 42 to regulate the amount or thickness of the paste discharged from the hopper.

At the right hand end of the machine is shown the mechanism for uniting the sugar-wafer sections into one structural mass, and the same consists of two transverse rollers 56 56′ mounted in bearings 57, 57 secured upon the frame 10, and 58 denotes an endless belt or band passing over said rollers 56, 56′. Upon the frame 10 intermediate the rollers 56, 56′ are secured brackets 59 59 within which are arranged a fixed pressure plate 60, and an adjustable plate 61 between which the lower portion of the belt 58 is adapted to pass. At one end of the shaft of the roller 56 is mounted a gear wheel 62 meshing with a similar gear wheel 63 on the shaft of the roller 14′ arranged within the frame directly below the roller 56′.

The operation of the machine is as follows: Assuming the machine to be in operation, and the endless belts 13, 30, and 58 to be moving in the direction of the arrows (Fig. 1), it simply becomes necessary to open the gate or valve 42 within the hopper 40 to the required extent which will be indicated by the gage 45 thereon; adjust the spreading blade 54× by means of the adjusting screw 52 and nut 54 and then feed the wafer sheets into the machine upon the conveyer 13. The paste will thereupon be caused to issue from the hopper 40 through the transversely open bottom of the hopper, and be deposited upon the wafer sheets as the same pass under said hopper, and spread under pressure upon said wafer sheets in the form of an even, uniform layer by the spring pressed lower end of the blade 54×. Hereupon the upper wafer sheet is disposed upon said coated layer, and the whole united by pressure of the plates 60, 61, as the same is caused to pass between said plates, and intermediate the endless band 58 and conveyer 13. In the operation of the machine the paste in the hopper 40 is constantly agitated by the action of the arms 49 and blade 50, which agitator also serves to cause the paste to issue uniformly from the open lower portion of the hopper.

The amount of paste deposited and spread upon the wafer sheet may be regulated or controlled by means of the gate or valve 42 and the pivoted blade 54, the adjustment of which is to a certain extent dependent upon the speed with which the wafer-sheets to be coated are caused to travel below the hopper upon the conveyer 13.

Without limiting myself to the precise details of construction, which may be varied within the scope of the invention, what I claim and desire to secure by Letters Patent is:

1. In a machine of the character described the combination with a support for wafer sheets, of a paste receptacle open at its base, disposed above said support, a spreading device pivotally secured at one edge adjacent to the open base of said paste receptacle, and serving at its other edge to spread the deposited material upon said wafer-sheets, and means for adjusting the free edge of said spreading device, substantially as specified.

2. In a machine of the character described, the combination with a support for wafer-sheets, of a paste receptacle open at its base disposed above said support, a spreading device pivotally secured along one of its edges to said paste receptacle, and its other edge held spring-pressed to spread the deposited material under pressure upon said wafer-sheets and means for regulating the tension of said spring-pressed edge, substantially as specified.

3. In a machine of the character described, the combination with a support for wafer-sheets, of a paste receptacle open at its base disposed above said support, a spreading device pivotally secured at one of its edges to the base of said receptacle, and its other edge yieldingly supported, a spring bearing upon said edge and serving at said edge to spread the deposited material under pressure upon said wafer-sheets, and means for adjusting the tension of said spring, substantially as specified.

4. In a machine of the character described, the combination with a support for wafer-sheets, of a paste receptacle open at its base and co-extensive in width with said support disposed above the same, a spreading device comprising a plate pivotally secured along one of its edges to the bottom edge of said receptacle, a screw pivotally secured at one end to said plate at its other edge, and the other end of said screw adjustably supported upon said paste receptacle, and a blade adjustably secured to said plate serving to spread the deposited material upon said wafer-sheets, substantially as specified.

5. In a machine of the character described, the combination with a support for wafer-sheets, of a paste receptacle open at its base and co-extensive in width with said support disposed above the same, a plate pivotally suspended in said paste receptacle, a spreading device comprising a plate pivotally secured at one edge to said paste receptacle, a bar arranged above said plate, a screw pivotally secured at one end to said plate and its other end extending through the bar aforesaid, an adjusting nut upon said screw and a spring disposed upon said screw intermediate said plate and bar, a blade adjustably secured upon the underside of said plate serving at one edge to spread the deposited material upon the wafer sheets and at its other edge, in coöperation with the free end of the plate suspended within said receptacle, to control the discharge of paste therefrom, substantially as specified.

6. In a machine of the character described, the combination with a support for wafer-sheets, of a paste receptacle open at its base and co-extensive in width with said support disposed above the same, means arranged in the base of said receptacle for controlling the flow of paste therethrough, means for indicating the position of said controlling means, a spreading device comprising a plate pivotally secured along one of its edges to the bottom edge of said receptacle, a screw pivotally secured at one end to said plate at its other edge, and the other end of said screw adjustably supported upon said paste receptacle, and a blade adjustably secured to said plate serving to spread the deposited material upon said wafer-sheets, substantially as specified.

7. In a machine of the character described, the combination with a support for wafer-sheets, of a paste receptacle open at its base and co-extensive in width with said support disposed above the same, means arranged in the base of said receptacle for controlling the flow of paste therethrough, means for securing said controlling means to its adjusted position, means for indicating the position of said controlling means, a spreading device comprising a plate pivotally secured along one of its edges to the bottom edge of said receptacle, a screw pivotally secured at one end to said plate at its other edge, and the other end of said screw adjustably supported upon said paste receptacle, and a blade adjustably secured to said plate serving to spread the deposited material upon said wafer-sheets, substantially as specified.

8. In a machine of the character described, the combination with a support for wafer sheets, of a paste receptacle open at its base and co-extensive in width with said support disposed above the same, a plate pivotally suspended in said paste receptacle, an arm secured thereto, a pawl and an indicating finger carried thereby, a graduated segmental plate secured to said receptacle provided with a rack adapted to be engaged by the pawl on said arm, a spreading device comprising a plate pivotally secured at one edge to said paste receptacle, a bar arranged above said plate, a screw pivotally secured at one end to said plate and its other end extending through the bar aforesaid, an adjusting nut upon said screw and a spring disposed upon said screw intermediate said plate and bar, a blade adjustably secured upon the underside of said plate serving at one edge to spread the deposited material upon the wafer sheets, and at its other edge, in coöperation with the free end of the plate suspended within said receptacle, to control the discharge of paste therefrom, substantially as specified.

Signed at the city of New York, in the county and State of New York, this thirteenth day of November, nineteen hundred and five.

FRANK M. PETERS.

Witnesses:
C. A. DIETERICH,
H. H. HUNGERFORD.